(12) United States Patent
Lam et al.

(10) Patent No.: US 11,991,401 B2
(45) Date of Patent: May 21, 2024

(54) METHOD FOR SEARCHING ADVERTISEMENT INSERTION POSITION AND METHOD FOR AUTOMATICALLY INSERTING ADVERTISEMENT IN VIDEO

(71) Applicant: Zyetric Technologies Limited, Hong Kong (HK)

(72) Inventors: Pak Kit Lam, Hong Kong (HK); Cheng Yang, Auckland (NZ)

(73) Assignee: Zyetric Technologies Limited, Hong Kong (HK)

( * ) Notice: Subject to any disclaimer, the term of this patent is extended or adjusted under 35 U.S.C. 154(b) by 0 days.

(21) Appl. No.: 18/051,009

(22) Filed: Oct. 30, 2022

(65) Prior Publication Data
US 2023/0291938 A1 Sep. 14, 2023

(30) Foreign Application Priority Data

Mar. 14, 2022 (CN) .......................... 202210247919.5

(51) Int. Cl.
*H04N 21/234* (2011.01)

(52) U.S. Cl.
CPC . *H04N 21/23424* (2013.01); *H04N 21/23418* (2013.01)

(58) Field of Classification Search
CPC .................. H04N 21/23424; H04N 21/23418
See application file for complete search history.

(56) References Cited

U.S. PATENT DOCUMENTS

| 2011/0188836 | A1* | 8/2011 | Popkiewicz | ......... | G11B 27/036 |
| | | | | | 386/300 |
| 2017/0278289 | A1* | 9/2017 | Marino | .................... | G06T 7/536 |
| 2022/0191583 | A1* | 6/2022 | Baran | ..................... | H04L 65/80 |

* cited by examiner

*Primary Examiner* — Kyu Chae

(57) ABSTRACT

A method for searching an AD insertion position includes following steps: S1. identifying a human body area in a video image; S2. identifying a blank wall area in the video image; and S3. determining the AD insertion position in the blank wall area in the video image, so that the AD insertion position intersects the human body area. A method for automatically inserting an advertisement AD in a video includes following steps: determining an AD insertion position in the video by searching a product AD insertion position based on deep learning, and inserting the AD on the position. Through the method, an appropriate position for an AD can be automatically searched on a blank wall part in the video. In addition, the inserted AD can be presented in the video in a natural way, and thereby avoiding or reducing the impact of AD insertion on impression of the video.

18 Claims, No Drawings

METHOD FOR SEARCHING ADVERTISEMENT INSERTION POSITION AND METHOD FOR AUTOMATICALLY INSERTING ADVERTISEMENT IN VIDEO

CROSS REFERENCE TO RELATED APPLICATION

This application claims priority of Chinese patent application No. 202210247919.5 filed on Mar. 14, 2022, the contents of which are all hereby incorporated by reference.

TECHNICAL FIELD

The present disclosure relates to artificial intelligence and machine learning, in particular to a method for searching an advertisement insertion position and a method for automatically inserting an advertisement in a video.

BACKGROUND ART

Nowadays, deep convolutional neural networks (DCNNs) are getting popular in industrial applications. In particular, they are used to advertise on Internet websites, images or videos. Most of them just detect targets/objects for advertisement replacement. For example, if there is a picture box in a social media video background, a DCNN can automatically detect this picture box. Then, according to a detection position, the picture box can be automatically replaced with a certain advertisement (AD) by certain software. For example, if a DCNN detects a table in a video, the software can automatically place an image of a product as an AD on the table.

However, there may not be specific targets/objects that can be detected and replaced with ADs in some images or social media videos. It is supposed that there is a video in which there is only a blank wall (including a wall with a blank part) and a person and no obvious target/object that can be replaced with an AD can be detected by a DCNN, it is very difficult to automatically place the AD on the blank wall by using the DCNN, as the DCNN cannot find an appropriate replacement position for a product AD. If the software randomly selects a position, the position may be unreasonable, and after the AD is replaced on this position, the effects of social media videos may be very unsatisfactory, which affects the experience of users of the social media videos.

It should be noted that the information disclosed in the above-mentioned background art is only for an understanding of the background of the present application, and therefore, it may include information that does not constitute the prior art known by a person of ordinary skill in the art.

SUMMARY OF THE INVENTION

The main objective of the present disclosure is to overcome the defects in the above-mentioned background art and provide a method for searching an AD insertion position based on deep learning and a method for automatically inserting an AD in a video, by which an appropriate position where the AD is inserted can be automatically found in the video, and the impact of AD insertion on impression of the video can be avoided or reduced.

In order to achieve the above-mentioned objective, the present disclosure adopts the following technical solutions.

In a first aspect of the present disclosure, provided is a method for searching an AD insertion position, including the following steps:
S1. identifying a human body area in a video image;
S2. identifying a blank wall area in the video image; and
S3. determining the AD insertion position in the blank wall area in the video image, so that the AD insertion position intersects the human body area.

In some embodiments, in step S1, the human body area is segmented by using a neural network, the neural network takes the video image as input and outputs a masked image $M_h(x,y)$ of a human body, the width and height of the masked image $M_h(x,y)$ are the same as the width W and height H of the video image $I(x,y)$, respectively, $x=\{0,1,\ldots,W-1\}$ and $y=\{0,1,\ldots,H-1\}$, pixel values in the masked image $M_h(x,y)$ are that:
pixels in a non-human body area are expressed as $M_h(x,y)=0$; pixels in the human body area are expressed as $M_h(x,y)=1$; and
the human body area in the masked image $M_h(x,y)$ is: $R_h(x,y)$, when $M_h(x,y)=1$.

In some embodiments, in step S2, the blank wall area is segmented by using a neural network; the neural network takes the video image as input and outputs a masked image $M_w(x,y)$ of the blank wall area, the width and height of the masked image $M_w(x,y)$ are the same as the width W and height H of the video image $I(x,y)$, respectively, $x=\{0,1,\ldots,W-1\}$ and $y=\{0,1,\ldots,H-1\}$, pixel values in the masked image $M_w(x,y)$ are that:
pixels in a non-blank wall area are expressed as $M_w(x,y)=0$; pixels in the blank wall area are expressed as $M_w(x,y)=1$; and
the blank wall area in the masked image $M_w(x,y)$ is:

$$R_w(x,y), \text{ when } M_w(x,y)=1.$$

In some embodiments, in step S3, a rectangular area suitable for inserting the AD is determined in the blank wall area.

In some embodiments, step S3 further includes the following steps:
step S31: initially setting the height $W_r$ and width $H_r$ of the rectangular area, respectively, and determining initial coordinates of the top-left corner coordinates $(x_1, y_1)$, top-right corner coordinates $(x_2,y_2)$, bottom-right corner coordinates $(x_3,y_3)$ and bottom-left corner coordinates $(x_4,y_4)$ of the rectangular area;
step S32: based on the four corner coordinates of the rectangular area, creating a masked image $M_r(x,y)$ to mark the rectangular area, wherein the width and height of the masked image $M_r(x,y)$ of the rectangular area are the same as the width and height of the video image, respectively, pixel values in the masked image $M_r(x,y)$ are that:
pixels in a non-rectangular area are expressed as $M_r(x,y)=0$; pixels in the rectangular area are expressed as $M_r(x,y)=1$;
the rectangular area in the masked image $M_r(x,y)$ is:

$$R_r(x,y), \text{ when } M_r(x,y)=1;$$

then, determining the position of the rectangular area by using the masked image $M_h(x,y)$ of the human body and the masked image $M_w(x,y)$ of the blank wall area, wherein
an area where the human body area intersects the rectangular area is:

$$R_1 = R_h \cap R_r,$$

an area where the blank wall area intersects the rectangular area is:

$$R_2 = R_w \cap R_r,$$

the position of the rectangular area satisfies the following conditions:

$$R_1 = R_r * N\%, \text{ and } R_2 = R_r * (100-N)\%, \text{ wherein } 0 < N < 100;$$

step S33: if the rectangular area does not satisfy the conditions, moving the rectangular area on the video image, in the same row, moving the rectangular area from left to right, determining the next positions of the four corners of the rectangular area, and calculating whether the new position of the rectangular area satisfies the conditions or not;

step S34: if the rectangular area still does not satisfy the conditions, moving the rectangular area to the next row, moving the rectangular area from left to right in the next row, and calculating whether the new position of the rectangular area satisfies the conditions or not; and repeating steps S33 to S34 until a position satisfies the conditions is found.

In some embodiments, in step S31, the height $W_r$ and width $H_r$ of the rectangular area are initially set to be 1/n of the height and width of the video image, respectively:

$$W_r = W/n; \ H_r = H/n,$$

the position of the top-left corner coordinates of the rectangular area is initially set in the first column of the video image and the $(1/n)^{th}$ row of the height of the image, and for the top-left corner coordinates $(x_1, y_1)$, the top-right corner coordinates $(x_2, y_2)$, the bottom-right corner coordinates $(x_3, y_3)$ and the bottom-left corner coordinates $(x_4, y_4)$, the respective initial coordinates are:

$$x^c_1 = 0; y^d_1 = H/n$$

$$x^c_2 = 0 + W_r; y^d_2 = H/n$$

$$x^c_3 = 0 + W_r; y^d_3 = (H/n) + H_r$$

$$x^c_4 = 0; y^d_4 = (H/n) + H_r.$$

In some embodiments, n=4.

In some embodiments, in step S32, the position of the rectangular area is enabled to satisfy the following conditions: $R_1 = R_r * N\%$, and $R_2 = R_r * (100-N)\%$; and the rectangular area is not occupied by areas for other objects. In some embodiments, N=20.

In some embodiments, in step S33, if the rectangular area does not satisfy the conditions, the rectangular area is moved on the video image by a distance which is m % of the width and height of the video image; in the same row, the rectangular area is moved from left to right, and the next positions of the four corners of the rectangular area are:

$$x^{c+1}_1 = x^c_1 + W * m\%; y^{d+1}_1 = y^d_1$$

$$x^{c+1}_2 = x^c_2 + W * m\%; y^{d+1}_2 = y^d_2$$

$$x^{c+1}_3 = x^c_3 + W * m\%; y^{d+1}_3 = y^d_3$$

$$x^{c+1}_4 = x^c_4 + W * m\%; y^{d+1}_4 = y^d_4,$$

wherein c represents column iteration, c represents the current column, and c+1 represents the next column; d represents row iteration, d represents the current row, and d+1 represents the next row; in some embodiments, m=2; and in step S34, if the rectangular area still does not meet the conditions in step S32, the rectangular area is moved to the next row, and the next positions of the four corners of the rectangular area are determined as:

$$x^{c+1}_1 = x^c_1; y^{d+1}_1 = y^d_1 + H * m\%$$

$$x^{c+1}_2 = x^c_1; y^{d+1}_2 = y^d_2 + H * m\%$$

$$x^{c+1}_3 = x^c_1; y^{d+1}_3 = y^d_3 + H * m\%$$

$$x^{c+1}_4 = x^c_1; y^{d+1}_4 = y^d_4 + H * m\%$$

In some embodiments, m=2.

In some embodiments, step S3 further includes the following steps:

step S35: if a position that satisfies the conditions is still not found in the rectangular area, reducing the size of the rectangular area, and then, performing searching again from an initial position to a final position; after the size is reduced, resetting the initial position of the rectangular area, and changing the positions of the four corners as:

$$x^{s+1}_1 = x^s_1; y^{s+1}_1 = y^s_1$$

$$x^{s+1}_2 = x^s_2 - D; y^{s+1}_2 = y^s_2$$

$$x^{s+1}_3 = x^s_3 - D; y^{s+1}_3 = y^s_3 - D$$

$$x^{s+1}_4 = x^s_4; y^{s+1}_4 = y^s_4 - D,$$

wherein s represents size iteration, s represents the current size, and s+1 represents the next size; D represents the reduced size which is D pixel values; in some embodiments, D=2; and then, repeating steps S33 to S35 until the position that satisfies the conditions is found.

In some embodiments, in step S35, the reduction in size in each searching iteration is to reduce the D pixel values.

In some embodiments, D=2.

In some embodiments, position searching in steps S1 to S3 is operated on a first frame of a video, and the determined position is used for all frames of the video.

In some embodiments, in step S1, the neural network is a MODNet.

In some embodiments, in step S2, the neural network is a MODNet.

In some embodiments, the neural network is trained by using pre-collected and marked blank wall data to obtain weights.

In some embodiments, the neural network is trained by using the pre-collected and marked blank wall data to obtain the weights, which includes: collecting video images of blank walls as a dataset; creating an alpha matte, marking background pixels with an alpha value "0" of the alpha matte, marking a foreground with a value "1", and marking an unknown part and a boundary between the foreground and a background with a value "0.5"; during training, using original images and corresponding alpha mattes, then, creating a neural network architecture, and loading pre-trained weights; and finally, training the neural network by using the dataset to obtain the weights for blank wall segmentation.

In some embodiments, the video is a social media video.

In some embodiments, the AD is a product AD.

In a second aspect of the present disclosure, provided is a computer-readable storage medium, wherein when a computer program stored in the computer-readable storage medium is operated by a processor, the method for searching the AD insertion position based on deep learning is implemented.

In a third aspect of the present disclosure, provided is a method for automatically inserting an AD in a video, including the following steps: determining an AD insertion position in the video by using the method for searching the AD insertion position, and inserting the AD on the position.

In a fourth aspect of the present disclosure, provided is a computer-readable storage medium, wherein when a computer program stored in the computer-readable storage medium is operated by a processor, the method for automatically inserting the AD in the video is implemented.

The present disclosure has the following beneficial effects:

the present disclosure provides a method for searching a product AD insertion position based on deep learning, by which an appropriate position can be automatically searched on a blank wall part in a social media video, and then, an AD can be automatically inserted on the appropriate position of a blank wall. By intersection of an AD insertion position and a human body area in the video, a part of the AD insertion position is shielded by a human body, so that the inserted AD can be presented in the video in a natural way, the impression of the video is not affected by AD insertion, or impact on the impression is reduced at least, and then, the experience of a user is improved.

DETAILED DESCRIPTION OF THE INVENTION

Implementations of the present disclosure will be described in detail below. It should be emphasized that the following description is exemplary only, and is not intended to limit the scope and application of the present disclosure.

It should be understood that directional or positional relationships indicated by the terms "length", "width", "upper", "lower", "front", "rear", "left", "right", "vertical", "horizontal", "top", "bottom", "inner" and "outer" are only intended to facilitate describing the embodiments of the present disclosure and simplifying the description, rather than to indicate or imply that the appointed device or element has to be located in a specific direction or structured and operated in the specific direction so as not to be understood as restrictions on the present disclosure.

In addition, the terms "first" and "second" are only used for descriptive purposes, and should not be understood as indicating or implying relative importance or implying the number of indicated technical features. Thus, a feature defined as "first" or "second" may expressly or implicitly include one or more of the features. In the description of the embodiments of the present disclosure, "a plurality of" means two or more, unless otherwise expressly and specifically defined.

An embodiment of the present disclosure provides a method for searching an AD insertion position, including the following steps.

S1. a human body area in a video image is identified.

In this step, the human body area in the video image is determined by performing human body segmentation in the video image.

S2. a blank wall area in the video image is identified.

In this step, the blank wall area in the video image is determined by performing wall segmentation in the video image. The blank wall area includes both completely blank walls and blank parts of any walls.

S3. the AD insertion position is determined in the blank wall area in the video image, so that the AD insertion position intersects the human body area.

In this step, an appropriate position is determined as the AD insertion position according to the human body area identified in step S1 and the blank wall area identified in step S2, so that the effect that a part of the AD insertion position is shielded by a human body is visually formed.

In some embodiments, it is supposed that I(x,y) is an image of a video with a width W and a height H. Therefore, $x=\{0,1,\ldots,W-1\}$ and $y=\{0,1,\ldots,H-1\}$.

Step S1: human body segmentation is performed in the video image by using a neural network, so that a pixel area of the human body is accurately found in the video. Preferably, we segment the human body area by using a MODNet. By using the MODNet, image background removal is performed, and the human body is used as a foreground to be segmented according to edge details between the human body and the background. Creators of MODNet provide pre-trained weights for human body segmentation. The neural network takes a RGB image of the video as input and outputs a masked image, namely a masked image $M_h(x,y)$ of the human body, a pixel value in the human body area is "1", and a pixel value in the background area is "0". The width and height of the masked image $M_h(x,y)$ of the human body are the same as the width and height of the video image I(x,y). Pixel values in the masked image $M_h(x,y)$ of the human body are:

$M_h(x,y)=0$ (non-human body pixels); $M_h(x,y)=1$ (human body pixels); and the pixel area of the human body in the masked image $M_h(x,y)$ of the human body is defined as:

$R_h(x,y)$, when $M_h(x,y)=1$.

Step S2: the MODNet is also preferred for blank wall segmentation. However, a blank wall cannot be segmented by the original MODNet because there are no weights available for this task. Therefore, we collect and mark blank wall data and train the MODNet to obtain the weights. The specific contents will be further introduced in the following embodiments. When we get appropriate MODNet weights, the MODNet takes the RGB image of the video as input and outputs another masked image, namely a masked image $M_w(x,y)$ of the blank wall, which contains pixels "1" as the blank wall area and pixels "0" as areas for other objects (such as people, tables and decorations). The width and height of the masked image $M_w(x,y)$ of the blank wall are also the same as those of the video frame I(x,y). Pixel values in the masked image $M_2(x,y)$ of the blank wall are:

$M_w(x,y)=0$ (non-blank wall pixels); $M_2(x,y)=1$ (blank wall pixels);

the blank wall area in the masked image $M_w(x,y)$ of the blank wall is defined as:

$R_w(x,y)$, when $M_w(x,y)=1$.

Step S3: in this step, a rectangular area suitable for inserting an AD is found on the wall according to the human body area identified in step S1 and the blank wall area identified in step S2. This task may be completed by using a model called an AD insertion position searcher.

In a preferred embodiment, step S3 specifically includes five steps described as follows.

Step S31: after a video frame (image) is input to the model, the initial height and width of the rectangle are 1/n of the height and width of the video image. The width $W_r$ and height $H_r$ of the rectangular area are respectively:

$W_r=W/n; H_r=H/n,$ the top-left corner coordinates of the rectangle are initially set in the first column of the video image and the (1/n)th row of the height of the image, and for four corners: $(x_1,y_1)$ are the top-left corner coordinates, $(x_2,y_2)$ are top-right corner coordinates, $(x_3,y_3)$ are bottom-right corner coordinates, and $(x_4,y_4)$ are bottom-left corner coordinates; and the initial coordinates are:

$$x^c_1=0; y^d_1=H/n$$

$$x^c_2=0+W_r; y^d_2=H/n$$

$$x^c_3=0+W_r; y^d_3=(H/n)+H_r$$

$$x^c_4=0; y^d_4=(H/n)+H_r$$

In the above equation, c is the number of column iterations (movement), and d is the number of row iterations (movement). At first, the rectangle is in its initial position, therefore, c=1, and d=1. In some embodiments, n=4.

Step S32: based on the four corner coordinates of the rectangle, a masked image, namely a masked image $M_r$ of the rectangle, may be created to mark a pixel area of the rectangle. The width and height of the masked image $M_r$ of the rectangle are also the same as the width and height of the video image. Pixel values in the masked image $M_r$ of the rectangle are that:

$M_r(x,y)=0$ (non-rectangle pixels); $M_r(x,y)=1$ (rectangle pixels);

the pixel area of the rectangle in the masked image $M_r$ of the rectangle is:

$R_r(x,y)$, when $M_r(x,y)=1$.

Then, the optimal position of the rectangle is found by using the masked image $M_h$ of the human body in step S31 and the masked image $M_w$ of the blank wall in step S32. Preferably, the optimal position satisfies the following conditions: (100−N)% of the rectangle is occupied by the blank wall area, and N % of the rectangle is occupied by the human body. In some embodiments, N=20. Other than that, the rectangle is not occupied by areas for other objects. The areas of the three objects may be defined in the same dimension by the masked image $M_h$ of the human body, the masked image $M_w$ of the blank wall, and the masked image $M_r$ of the rectangle.

An area where the human body area intersects the rectangle is:

$R_1=R_h \cap R_r$.

An area where the blank wall area intersects the rectangle is:

$R_2=R_w \cap R_r$.

The position of the rectangular area satisfies the following conditions:

$R_1=R_r * N$ %, and $R_2=R_r*(100-N)$%.

In some embodiments, N=20.

Step S33: if the rectangle does not satisfy the conditions in step S32, the rectangle is moved on the video image. Preferably, the moving distance is m % of the width and height of the video image. In the same row, the rectangle is moved from left to right. Therefore, the next positions of the four corners of the rectangle are:

$$x^{c+1}_1=x^c_1+W*m \%; y^{d+1}_1=y^d_1$$

$$x^{c+1}_2=x^c_2+W*m \%; y^{d+1}_2=y^d_2$$

$$x^{c+1}_3=x^c_3+W*m \%; y^{d+1}_3=y^d_3$$

$$x^{c+1}_4=x^c_4+W*m \% y^{d+1}_4=y^d_4,$$

wherein c represents column iteration, c represents the current column, and c+1 represents the next column. Similarly, d represents row iteration, d represents the current row, and d+1 represents the next row. In some embodiments, m=2.

Then, step S32 is returned for calculation to check whether the new position of the rectangle satisfies the conditions in step 2 or not.

Step S34: if the rectangle still does not meet the conditions in step S32, the rectangle is moved to the next row, and the positions of the four corners are:

$$x^{c+1}_1=x^c_1; y^{d+1}_1=y^d_1=H*m \%$$

$$x^{c+1}_2=x^c_1; y^{d+1}_2=y^d_2+H*m \%$$

$$x^{c+1}_3=x^c_1; y^{d+1}_3=y^d_3+H*m \%$$

$$x^{c+1}_4=x^c_1; y^{d+1}_4=y^d_4+H*m \%.$$

In some embodiments, m=2.

In a new row, the rectangle is moved from left to right, and it is checked whether the conditions in step S32 are satisfied.

In summary, the rectangle is moved from left to right and then from top to bottom, and steps S33 to S34 are repeated. In one embodiment, the last searching position of the rectangle is on the rightmost of the middle of the video image.

Step S35: if a position that satisfies the conditions in step 2 is still not found in the rectangle after the above-mentioned steps are performed (one possible reason is that there are many decorations on the wall), the size of the rectangle is reduced, and then, searching is performed again from an initial position to a final position. Preferably, in each searching iteration, the size is reduced by D pixel values. After the size is reduced, the initial position is reset, and the positions of the four corners of the rectangle are changed as:

$$x^{s+1}_1=x^s_1; y^{s+1}_1=y^s_1$$

$$x^{s+1}_2=x^s_2-D; y^{s+1}_2=y^s_2$$

$$x^{s+1}_3=x^s_3-D; y^{s+1}_3=y^s_3-D$$

$$x^{s+1}_4=x^s_4; y^{s+1}_4=y^s_4-D.$$

In the above-mentioned equations, s represents the current size, s+1 represents the next size, and thus, size iteration is performed. In some embodiments, D=2. After the size of the rectangle is changed into another size, the operations from step S33 to step S35 are repeated until the rectangle satisfies the conditions in step S32. When the position of the rectangle satisfies the conditions in step S32, the searching is completed, and the model outputs the positions of the four corners of the rectangle on the video image. In one embodiment, position searching is operated on a first frame of a video, after completion, the searched position is used for all frames of the video.

Through the method in the embodiment of the present disclosure, the optimal position of an appropriate size can be found according to the size of the video and decorations on the blank wall.

In some other embodiments, the blank wall segmentation can also be completed by using any other deep neural network (DCNN) other than the MODNet. Any other neural networks for segmentation or image matting can also be trained on the blank wall dataset. After being trained, all of these neural networks can segment blank walls.

The search for the initial size of the rectangle can be defined by the video image and an AD image to be inserted. For example, preferably, the width of the rectangle may be ⅕ of the width of the video image, and the height of the rectangle may be calculated according to the width-to-height ratio of the AD image.

When an appropriate AD insertion position is searched, the searching position of the rectangle may be started or stopped on any position of the video image. For example, searching may start from the top-left corner of the video image and stop at the bottom-right corner, which depends on the definition of an AD position. For example, if we do not want to paste an AD beside the lower body of the human body, we can search the position only on the upper part of the video image.

In a further embodiment, the present disclosure further provides a method for training a MODNet for blank wall segmentation, which provides the weights of the MODNet (Matting Objective Decomposition Network) for the aforementioned step S2. Video images of blank walls can be collected as a blank wall dataset to train the MODNet. The dataset we collected includes 700 images of the blank walls. The MODNet utilizes an alpha matte as the ground truth for training. In the past, it took us a long time to mark the alpha matte. The reasons are as follows: background pixels are marked with an alpha value "0" of a normal alpha matte, a foreground is marked with a value "1", and an unknown part is marked with a value ranging from "0" to "1"; the unknown part is usually located on a boundary between the foreground and a background, such as human hair; and it needs a very long time to mark the alpha value ranging from "0" to "1" of each pixel. In order to save the marking time, we create a special method for marking alpha matte data: background pixels are marked with an alpha value "0", a foreground is marked with a value "1", and an unknown part and a boundary between the foreground and a background are marked with an alpha value "0.5". This special alpha matte can be automatically generated by a program that inputs data to the neural network. The training program loads the original images and the corresponding special alpha matte as data. Then, the training program creates a MODNet architecture and loads the pre-trained weights. Finally, the MODNet is trained by using the blank wall dataset to obtain the weights for blank wall segmentation. Our training results show that good results are achieved by training at the 12th epoch, which means a short training time.

The training method in this embodiment can also be used for any deep neural networks for image matting other than the MODNet. Any neural networks that require RGB images and corresponding alpha mattes as data are suitable for being trained by using the above-mentioned method for marking the alpha matte data.

In summary, an embodiment of the present disclosure provides a method for searching a product AD insertion position based on deep learning, by which a human body area and a blank wall area are found in a video, and an appropriate AD insertion position is found on a blank wall, wherein a part of the AD insertion position is shielded by a human body, so that the inserted AD can be presented in the video in a natural way, the impression of the video is not affected by AD insertion, or impact on the impression is reduced at least, and then, the experience of a user is improved.

In addition, an embodiment of the present disclosure further provides a method for automatically inserting an AD in a video, including the following steps: an AD insertion position in the video is determined by using the method for searching the AD insertion position in any one of the aforementioned embodiments, and the AD is inserted on the position. The video may be (but is not limited to) a social media video. The AD may be (but is not limited to) a product AD.

An embodiment of the present disclosure further provides a computer-readable storage medium in which a program product capable of implementing the above-mentioned method in the description. In some possible implementations, various aspects of the present disclosure may also be implemented in a form of the program product which includes a program code. When the program product runs on a terminal device, the program code is used to enable the terminal device to perform the steps according to various exemplary implementations of the present disclosure in the description for the part of the above-mentioned "exemplary method" in this description. It can adopt a portable compact disc read-only memory (CD-ROM) and include a program code, and can run on a terminal device such as a personal computer. However, the program product in the present disclosure is not limited thereto, and in this document, the readable storage medium may be any tangible medium that contains or stores a program that can be used by or in conjunction with an instruction execution system, apparatus or device.

Any description of a process or method described herein in the present disclosure may be understood to represent a module, segment or part of a code including one or more executable instructions for implementing a specific logical function or step of a process. Moreover, the scope of the preferred implementations of the present disclosure covers additional implementations in which the functions may be performed out of the order shown or discussed, including that the functions are performed in a substantially simultaneous way or in a reverse order according to the involved functions, which should be understood by the skilled in the art to which the embodiments of the present disclosure belong.

The logics and/or steps described herein in the present disclosure, for example, may be considered as an order list of executable instructions for implementing logical functions and may be embodied in any computer-readable storage medium so as to be used by or in conjunction with an instruction execution system, apparatus or device (such as a computer-based system, a system including a processor, or other systems that can get and execute instructions from the instruction execution system, apparatus or device). For this description, the "computer-readable storage medium" may be any device that can contain, store, communicate, propagate, or transmit a program so as to be used by or in conjunction with the instruction execution system, apparatus, or device. More specific examples (non-exhaustive list) of the computer-readable storage medium include the following: an electrical connection part (electronic apparatus) with one or more wiring, a portable computer disk cartridge (magnetic apparatus), a random access memory (RAM), a read-only memory (ROM), an erasable editable read-only memory (EPROM or Flash Memory), an optical fiber apparatus and a portable compact disc read-only memory (CDROM). In addition, the computer-readable storage medium may even be paper or other appropriate mediums on which the program can be printed, as it is possible that, for example, by optically scanning the paper or other mediums, and then, performing editing, interpreting or processing in other appropriate ways when it is necessary, the program is obtained in an electronic way and is then stored in a computer memory. The instruction execution system, apparatus or device may operate based on an operating system stored in a memory, such as Android, iOS, Windows, Mac OS X, Unix, Linux, FreeBSD and the like.

It should be understood that various parts of the present disclosure may be implemented in hardware, software, firmware or a combination thereof In the above-described implementations, a plurality of steps or methods may be implemented in software or firmware stored in a memory and executed by an appropriate instruction execution system. For example, if the steps or methods are implemented in hardware, as that in another implementation, they can be implemented by any one or a combination of the following techniques known in the art: a discrete logic circuit with a logic gate circuit for implementing a logic function for a data signal, an application-specific integrated circuit with an appropriate combinational logic gate circuit, a programmable gate array (PGA), a field programmable gate array (FPGA) and the like.

Those of ordinary skill in the art can understand that all or part of the steps carried by the methods in the above-mentioned embodiments can be completed by instructing relevant hardware through a program, and the program may be stored in a computer-readable storage medium. When the process is executed, one or a combination of the steps in the embodiments of the methods is included.

In addition, all steps or functional units in all the embodiments of the present disclosure may be integrated into one processing module, or each unit may exist physically alone, or two or more units may be integrated into one module. The above-mentioned integrated module can be implemented in a form of hardware, and can also be implemented in a form of a software functional module. If the integrated module is implemented in the form of the software functional module and sold or used as an independent product, it may also be stored in a computer-readable storage medium.

The background part of the present disclosure may include background information about problems or environments related to the present disclosure, but is not certain to describe the prior art. Therefore, the contents included in the background art should not be taken as an acknowledgment of an applicant to the prior art.

The above-mentioned contents are further detailed descriptions of the present disclosure with reference to the specific/preferred implementations, but cannot affirm that the specific implementations of the present disclosure are only limited to these descriptions. The ordinary skill in the art to which the present disclosure belongs may make several replacements or variations on these described implementations without departing from the conception of the present disclosure, and these replacement or variation ways should be regarded to fall within the protection scope of the present disclosure. In the descriptions of the present description, descriptions for reference terms "an embodiment", "some embodiments", "a preferred embodiment", "an example", "a specific example" or "some examples" mean that specific features, structures, materials or characteristics described with reference to the embodiments or examples are included in at least one embodiment or example of the present disclosure. In the present description, the schematic statement for the above-mentioned terms is not necessary for the same embodiment or example. Moreover, the described specific features, structures, materials or characteristics may be combined in any one or more embodiments or examples in an appropriate way. The different embodiments or examples or features of the different embodiments or examples described in the present description may be incorporated or combined by the skilled in the art without mutual conflicts. Although the embodiments of the present disclosure and advantages thereof have been described in detail, it should be understood that various changes, replacements or alterations may be made herein without departing from the protection scope of the patent application.

What is claimed is:

1. A method for searching an advertisement (AD) insertion position, comprising following steps:
   S1. identifying a human body area in a video image;
   S2. identifying a blank wall area in the video image; and
   S3. determining the AD insertion position in the blank wall area in the video image, so that the AD insertion position intersects the human body area;
   wherein in step S1, the human body area is segmented by using a neural network, the neural network takes the video image as input and outputs a masked image $M_h(x,y)$ of a human body, the width and height of the masked image $M_h(x,y)$ are the same as the width W and height H of the video image $I(x,y)$, respectively, $x=\{0, 1, \ldots, W-1\}$ and $y=\{0,1,\ldots,H-1\}$, pixel values in the masked image $M_h(x,y)$ are that:
   pixels in a non-human body area are expressed as $M_h(x,y)=0$; pixels in the human body area are expressed as $M_h(x,y)=1$; and
   the human body area in the masked image $M_h(x,y)$ is:

$R_h(x,y)$, when $M_h(x,y)=1$.

2. The method for searching the AD insertion position of claim 1, wherein in step S2, the blank wall area is segmented by using a neural network; the neural network takes the video image as input and outputs a masked image $M_w(x,y)$ of the blank wall area, the width and height of the masked image $M_w(x,y)$ are the same as the width W and height H of the video image $I(x,y)$, respectively, $x=\{0,1,\ldots,W-1\}$ and $y=\{0,1,\ldots,H-1\}$, pixel values in the masked image $M_w(x,y)$ are that:
   pixels in a non-blank wall area are expressed as $M_w(x,y)=0$; pixels in the blank wall area are expressed as $M_w(x,y)=1$; and
   the blank wall area in the masked image $M_w(x,y)$ is:

$R_w(x,y)$, when $M_w(x,y)=1$.

3. The method for searching the AD insertion position of claim 2, wherein in step S3, a rectangular area suitable for inserting the AD is determined in the blank wall area.

4. The method for searching the AD insertion position of claim 3, wherein step S3 further comprises following steps:
   step S31: initially setting the height $W_r$ and width $H_r$ of the rectangular area, respectively, and determining initial coordinates of the top-left corner coordinates $(x_1, y_1)$, top-right corner coordinates $(x_2,y_2)$, bottom-right corner coordinates $(x_3,y_3)$ and bottom-left corner coordinates $(x_4,y_4)$ of the rectangular area;
   step S32: based on the four corner coordinates of the rectangular area, creating a masked image $M_r(x,y)$ to mark the rectangular area, wherein the width and height of the masked image $M_r(x,y)$ of the rectangular area are the same as the width and height of the video image, respectively, pixel values in the masked image $M_r(x,y)$ are that:
   pixels in a non-rectangular area are expressed as $M_r(x,y)=0$; pixels in the rectangular area are expressed as $M_r(x,y)=1$;

the rectangular area in the masked image $M_r(x,y)$ is:

$$R_r(x,y), \text{ when } M_r(x,y)=1;$$

then, determining the position of the rectangular area by using the masked image $M_h(x,y)$ of the human body and the masked image $M_w(x, y)$ of the blank wall area, wherein an area where the human body area intersects the rectangular area is:

$$R_1 = R_h \cap R_r,$$

an area where the blank wall area intersects the rectangular area is:

$$R_2 = R_w \cap R_r,$$

the position of the rectangular area satisfies following conditions:

$$R_1 = R_r * N \%, \text{ and } R_2 = R_r*(100-N)\%, \text{ wherein } 0 < N < 100;$$

step S33: if the rectangular area does not satisfy the conditions, moving the rectangular area on the video image, in the same row, moving the rectangular area from left to right, determining the next positions of the four corners of the rectangular area, and calculating whether the new position of the rectangular area satisfies the conditions or not;

step S34: if the rectangular area still does not satisfy the conditions, moving the rectangular area to the next row, moving the rectangular area from left to right in the next row, and calculating whether the new position of the rectangular area satisfies the conditions or not; and repeating steps S33 to S34 until a position satisfies the conditions is found.

5. The method for searching the AD insertion position of claim 4, wherein in step S31, the height $W_r$ and width $H_r$ of the rectangular area are initially set to be 1/n of the height and width of the video image, respectively:

$$W_r = W/n; H_r = H/n,$$

the top-left corner coordinates of the rectangular area are initially set in the first column of the video image and the $(1/n)^{th}$ row of the height of the image, and for the top-left corner coordinates $(x_1,y_1)$, the top-right corner coordinates $(x_2,y_2)$, the bottom-right corner coordinates $(x_3,y_3)$ and the bottom-left corner coordinates $(x_4,y_4)$, the respective initial coordinates are:

$$x^c_1 = 0; y^d_1 = H/n$$

$$x^c_2 = 0 + W_r; y^d_2 = H/n$$

$$x^c_3 = 0 + W_r; y^d_3 = (H/n) + H_r$$

$$x^c_4 = 0; y^d_4 = (H/n) + H_r.$$

6. The method for searching the AD insertion position of claim 4, wherein in step S32, the position of the rectangular area is enabled to satisfy following conditions: $R_1 = R_r * N \%$, and $R_2 = R_r*(100-N)\%$; and the rectangular area is not occupied by areas for other objects.

7. The method for searching the AD insertion position of claim 4, wherein in step S33, if the rectangular area does not satisfy the conditions, the rectangular area is moved on the video image by a distance which is m % of the width and height of the video image; in the same row, the rectangular area is moved from left to right, and the next positions of the four corners of the rectangular area are:

$$x^{c+1}_1 = x^c_1 + W*m \%; y^{d+1}_1 = y^d_1$$

$$x^{c+1}_2 = x^c_2 + W*m \%; y^{d+1}_2 = y^d_2$$

$$x^{c+1}_3 = x^c_3 + W*m \%; y^{d+1}_3 = y^d_3$$

$$x^{c+1}_4 = x^c_4 + W*m \%; y^{d+1}_4 = y^d_4,$$

wherein c represents column iteration, c represents the current column, and c+1 represents the next column; d represents row iteration, d represents the current row, and d+1 represents the next row; and in step S34, if the rectangular area still does not meet the conditions in step S32, the rectangular area is moved to the next row, and the next positions of the four corners of the rectangular area are determined as:

$$x^{c+1}_1 = x^c_1; y^{d+1}_1 = y^d_1 + H*m \%$$

$$x^{c+1}_2 = x^c_1; y^{d\ 1}_2 = y^d_2 + H*m \%$$

$$x^{c+1}_3 = x^c_1; y^{d+1}_3 = y^d_3 + H*m \%$$

$$x^{c+1}_4 = x^c_1; y^{d+1}_4 = y^d_4 + H*m \%.$$

8. The method for searching the AD insertion position of claim 4, wherein step S3 further comprises following steps:

step S35: if a position that satisfies the conditions is still not found in the rectangular area, reducing the size of the rectangular area by D, and then, performing searching again from an initial position to a final position; after the size is reduced, resetting the initial position of the rectangular area, and changing the positions of the four corners as:

$$x^{s+1}_1 = x^s_1; y^{s+1}_1 = y^s_1$$

$$x^{s+1}_2 = x^s_2 - D; y^{s+1}_2 = y^s_2$$

$$x^{s+1}_3 = x^s_3 - D; y^{s+1}_3 = y^s_3 - D$$

$$x^{s+1}_4 = x^s_4; y^{s+1}_4 = y^s_4 - D,$$

wherein s represents the current size, and s+1 represents the next size; D represents the reduced size which is D pixel values; and then, repeating steps S33 to S35 until the position that satisfies the conditions is found.

9. The method for searching the AD insertion position of claim 8, wherein in step S35, the reduction in size in each searching iteration is to reduce the D pixel values.

10. The method for searching the AD insertion position of claim 1, wherein position searching in steps S1 to S3 is operated on a first frame of a video, and the determined position is used for all frames of the video.

11. The method for searching the AD insertion position of claim 1, wherein in steps S1 and S2, the neural network is a MODNet.

12. The method for searching the AD insertion position of claim 2, wherein the neural network is trained by using pre-collected and marked blank wall data to obtain weights.

13. The method for searching the AD insertion position of claim 12, wherein the step that the neural network is trained by using pre-collected and marked blank wall data to obtain weights comprises: collecting video images of blank walls as a dataset; creating an alpha matte, marking background pixels with an alpha value "0" of the alpha matte, marking a foreground with a value "1", and marking an unknown part and a boundary between the foreground and a background with a value "0.5"; during training, using original images and corresponding alpha mattes, then, creating a neural network architecture, and loading pre-trained weights; and finally, training the neural network by using the dataset to obtain the weights for blank wall segmentation.

14. The method for searching the AD insertion position of claim 1, wherein the video is a social media video.

15. The method for searching the AD insertion position of claim 1, wherein the AD is a product AD.

16. A non-transitory computer-readable storage medium, wherein when a computer program stored in the computer-readable storage medium is operated by a processor, a method for searching the AD insertion position is implemented, wherein the method comprises following steps:
   S1. identifying a human body area in a video image;
   S2. identifying a blank wall area in the video image; and
   S3. determining the AD insertion position in the blank wall area in the video image, so that the AD insertion position intersects the human body area;
   wherein in step S1, the human body area is segmented by using a neural network, the neural network takes the video image as input and outputs a masked image $M_h(x,y)$ of a human body, the width and height of the masked image $M_h(x,y)$ are the same as the width W and height H of the video image $I(x,y)$, respectively, $x=\{0, 1, \ldots, W-1\}$ and $y=\{0,1,\ldots,H-1\}$, pixel values in the masked image $M_h(x,y)$ are that:
   pixels in a non-human body area are expressed as $M_h(x,y)=0$; pixels in the human body area are expressed as $M_h(x,y)=1$; and
   the human body area in the masked image $M_h(x,y)$ is:

$R_h(x,y)$, when $M_h(x,y)=1$.

17. A method for automatically inserting an AD in a video, comprising following steps: searching the AD insertion position in the video by using a method for searching the AD insertion position based on deep learning, and inserting the AD on the position;
   wherein the method for searching the AD insertion position based on deep learning comprises following steps:
   S1. identifying a human body area in a video image;
   S2. identifying a blank wall area in the video image; and
   S3. determining the AD insertion position in the blank wall area in the video image, so that the AD insertion position intersects the human body area.
   wherein in step S1, the human body area is segmented by using a neural network, the neural network takes the video image as input and outputs a masked image $M_h(x,y)$ of a human body, the width and height of the masked image $M_h(x,y)$ are the same as the width W and height H of the video image $I(x,y)$, respectively, $x=\{0, 1, \ldots, W-1\}$ and $y=\{0,1,\ldots,H-1\}$, pixel values in the masked image $M_h(x,y)$ are that:
   pixels in a non-human body area are expressed as $M_h(x,y)=0$; pixels in the human body area are expressed as $M_h(x,y)=1$; and
   the human body area in the masked image $M_h(x,y)$ is:

$R_h(x,y)$, when $M_h(x,y)=1$.

18. A non-transitory computer-readable storage medium, wherein when a computer program stored in the computer-readable storage medium is operated by a processor, the method for automatically inserting the AD in the video of claim 17 is implemented.

* * * * *